Nov. 7, 1967
M. B. LEISING
3,350,882
VEHICLE BRAKING SYSTEM
Filed Oct. 6, 1964
2 Sheets-Sheet 1
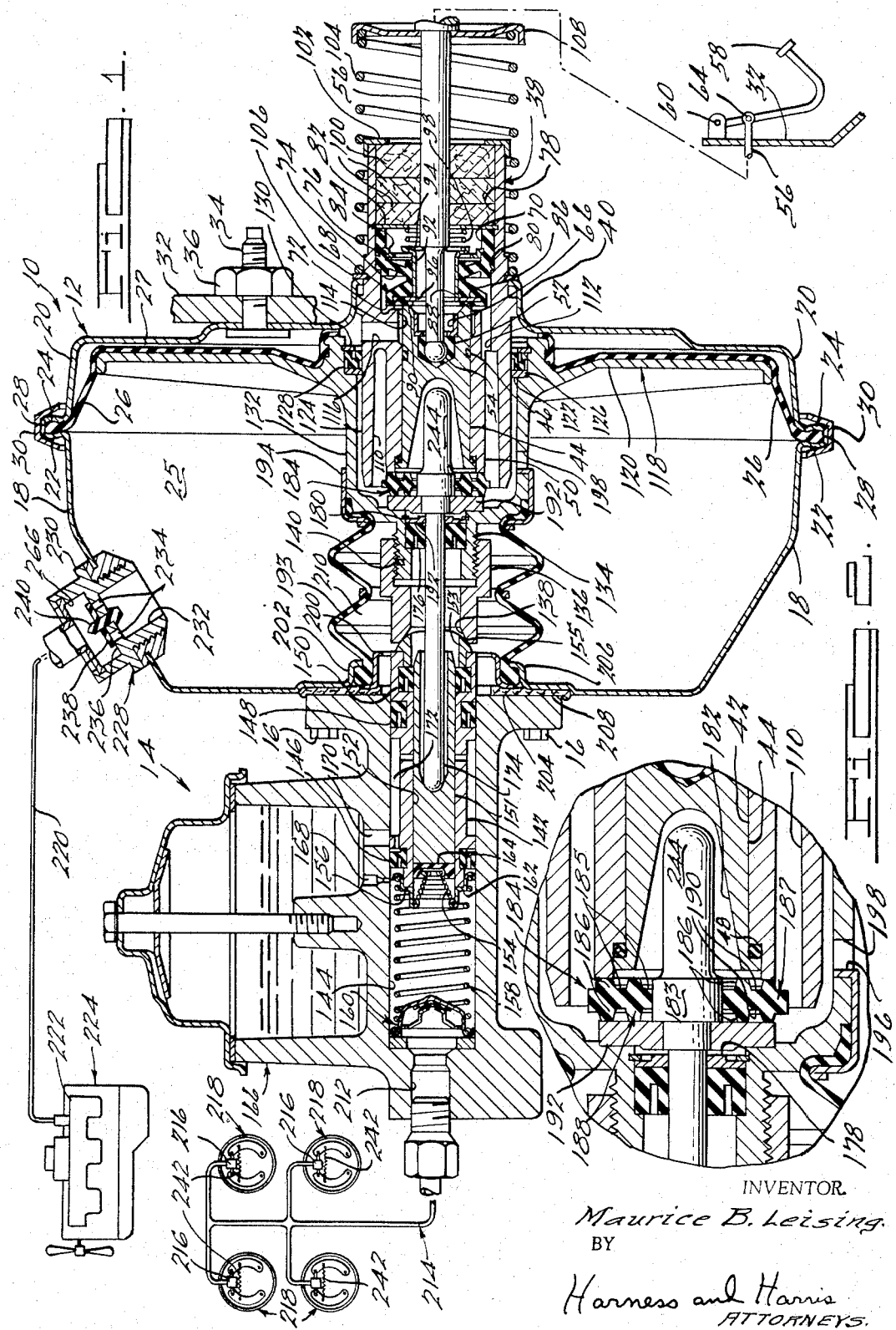
INVENTOR.
Maurice B. Leising.
BY
Harness and Harris
ATTORNEYS.

United States Patent Office 3,350,882
Patented Nov. 7, 1967

3,350,882
VEHICLE BRAKING SYSTEM
Maurice B. Leising, Clawson, Mich., assignor to Chrysler Corporation, Highland Park, Mich., a corporation of Delaware
Filed Oct. 6, 1964, Ser. No. 401,773
11 Claims. (Cl. 60—54.6)

This invention relates generally to a vehicle braking system and more particularly to a power brake unit employed within such a system.

The various differential fluid pressure operated power brake units proposed in the past can be broadly classified into two general categories, the first of which includes those power brake units which supplement the vehicle operator's physically applied braking force throughout the entire range of vehicle braking. That is, with such power brake units the operator continually contributes a small percentage of the total work required by the braking system in achieving the desired vehicle braking.

The second category includes those power brake units wherein the force exerted by the vehicle operator does not contribute to the work of the brake system. Such are often referred to as full power brake units as contrasted to those of the first category which are often referred to as power assist brake units.

Although power brake units of both categories have been employed in vehicle braking systems they, nevertheless, each have exhibited characteristics which in at least some instances are considered to be highly undesirable.

For example, in various earlier power brake units the operator did not experience a pedal "feel" proportional to the applied vehicle braking force. Accordingly, since such power brake units did not inherently provide a proper pedal feel, various devices and arrangements have been added to the basic power brake unit for the express purpose of creating a sensory signal, through the brake pedal to the operator, indicative of the applied vehicle braking force.

These devices, in general, function to develop a reaction force directly proportional to the hydraulic line pressure and transmit this force back to the brake pedal so that the operator is provided with a pedal feel directly proportional to the line pressure. However, the self energizing brakes currently in popular use develop an actual braking force which is not directly proportional to the line pressure but which, rather, increases by larger and larger increments for each successive increment of increased line pressure. Accordingly, the pedal feel provided by these devices is not, as is desirable, directly proportional to the actual deceleration that the vehicle is undergoing.

These prior devices are also undesirable in that their construction is such that major modifications in the various components for transmitting the reaction force are necessary in order to adapt the basic brake in which these devices are employed to varying braking requirements. That is, these devices do not provide any readily variable characteristic by which the same basic brake might be adapted for use with, for example, both a relatively light vehicle and a relatively heavy vehicle.

Accordingly, it is an object of the present invention to provide a novel and improved power brake unit which is capable of providing the vehicle operator with a brake pedal feel which is more directly proportional to the actual deceleration that the vehicle is undergoing than in prior devices.

Another object is to provide a novel and improved power brake unit which provides a readily variable characteristic by which the relationship of pedal feel to line pressure may be selectively varied to readily adapt the brake unit to vehicles having varying braking requirements.

Other more specific objects and advantages of the invention will become apparent when reference is made to the following description and accompanying drawings wherein:

FIGURE 1 is a longitudinal cross-sectional view of a power brake unit constructed in accordance with the teachings of the invention shown in combination with other schematically illustrated portions of a vehicle braking system;

FIGURE 2 is a view, on an enlarged scale, of a portion of the power brake unit of FIGURE 1.

Figure 3:
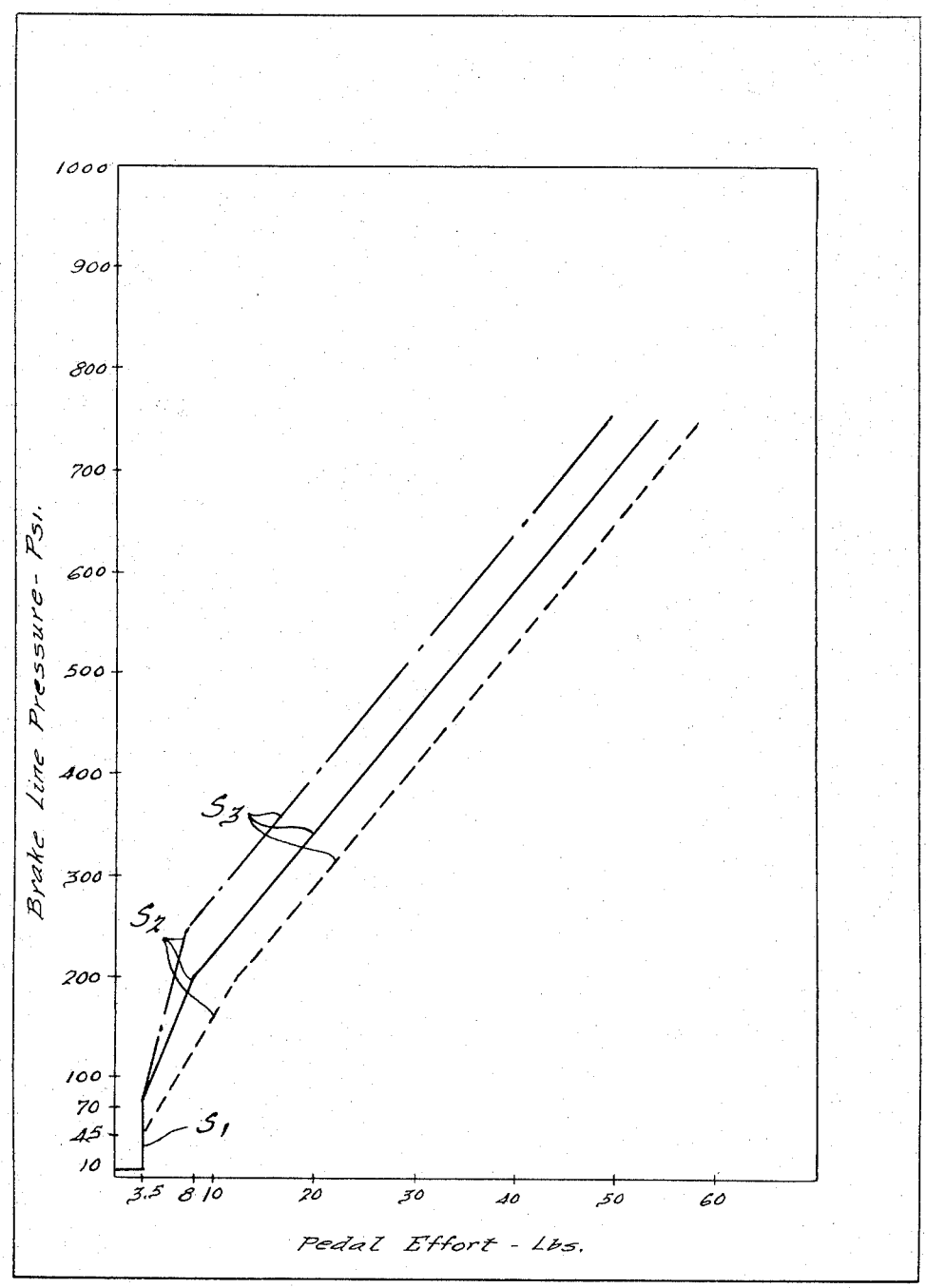
FIGURE 3 is a graph showing selected performance characteristics of a power brake unit of the type shown in FIGURES 1 and 2.

Referring now in greater detail to the drawings, FIGURE 1 illustrates a power brake unit 10 comprising a fluid pressure servo motor 12 and a master cylinder assembly 14 suitably secured thereto as by screws 16.

The servo motor housing is formed by cup-like housing sections 18 and 20 provided with generally radially directed flanges 22 and 24, respectively. A flexible diaphragm 26, secured to the housing by means of a peripheral bead 28 retained between flanges 22 and 24, defines at opposite sides thereof variable but distinct fluid pressure chambers 25 and 27. An annular retainer member 30, located generally circumferentially about the servo motor housing, serves to secure housing sections 18 and 20 by urging the respective flanges 22 and 24 against bead 28 and towards each other. The entire power brake unit 10, including master cylinder assembly 14, is secured to a suitable supporting structure such as a vehicle firewall 32 by means of screws 34 (one of which is shown) carried by housing section 20 and coacting with nut 36.

A valve body 38 is suitably secured to housing section 20 generally centrally thereof by means of annular flange 40. Valve body 38 has a central bore 42 formed therein for slidably receiving a valve plunger member 44. A seal 46 received within an annular groove formed in plunger 44 and a second seal 48, retained within a counterbore formed in valve body 38 by a radial flange 50 of plunger 44, serve to prevent leakage of fluid pressure between the valve body bore 42 and plunger 44.

One end of plunger 44 has a bore formed therein for closely receiving a relatively resilient retainer 52 which in turn receives the generally spherical end 54 of an actuating or brake pedal rod 56. An operator controlled brake pedal 58, suitably pivotally supported as at 60 to the vehicle firewall 32, is operatively connected as at 64 to the actuating rod 56. A cup-like retainer 66 tightly received by plunger 44 serves to retain the resilient member 52 in the position illustrated.

A relatively resilient poppet valve 68 comprised generally of a tubular body portion 70 and a generally tubular valving portion 72 connected to each other by a relatively thin flexible portion 74, is retained within an annular groove 76 formed generally in an axial bore 78 of valve body 38. The annular groove 76 is defined at one axial end by a radially directed shoulder 80 and at the other axial end by a resilient annular snap ring 82 suitably retained within the bore 78. A cup-like member 84, having a centrally disposed aperture formed therethrough and a radially directed peripheral flange, maintains poppet valve body portion 70 radially outwardly in seated engagement with groove 76.

A relatively thin annular ring 86 received within the valving portion 72 of poppet valve 68 maintains that valving portion in proper configuration for engaging or seating against annular valving surfaces 88 and 90 of plunger 44 and valve body 38, respectively. A tubular member 92 provided with a radially directed flange 94 abuts against the radially inner portion 96 of ring 86 and, by virtue of compression spring 98 retained between flange 94 and snap ring 82, urges ring 86 and valving portion 72 towards engagement with valve seats 88 and 90.

A fibrous filter 100 fills the annular space between brake rod 56 and bore 78 and is retained axially between the snap ring 82 and a suitable annular retainer cap 102 carried by the valve body 38. A coiled compression spring 104 is seated at one end against the valve body retainer ring 106 and acts at its other end against an annular spring retainer 108 rigid with rod 56 to urge rod 56, brake pedal 58, plunger 44 and valving portion 72 of poppet valve 68 in to the respective positions shown, during periods in which the power brake unit 10 is inactive or at rest.

Valve body 38 is also provided with an axially directed annular recess 110 which communicates with a plurality of axially directed passages 112 (one of which is shown) extending from one end thereof. An enlargement of one end of bore 42 forms an annulus 114, defined generally by the plunger 44 and valve body 38, which communicates with a plurality of radially directed passages 116, which also are in communication with chamber 27.

A power piston 118, comprising a diaphragm 26 and a piston member 120, is carried by valve body 38 in a manner permitting relative axial movement therebetween. An annular bearing 122 closely received about the outer diameter 124 of valve body 38 and closely received within a counterbore 126 of piston member 120 enables the power piston 118 to slide axially along diameter 124 whenever a sufficient pressure differential is created across the power piston. Leakage of fluid pressure between valve body 38 and piston member 120 is effectively prevented by a suitable annular seal 128 retained between the bearing 122 and a retainer ring 130 suitably secured to and carried by the piston member 120.

An axially directed centrally disposed cylindrical extension 132 of piston member 120 has a portion 134 of reduced diameter which is externally threaded to receive an internally threaded tubular adjusting nut 136 having a conical abutment surface 138 formed at one end thereof. A suitable threaded locking member 140 may be provided so as to minimize any possible tendency of adjusting nut 136 to rotate relative to threaded portion 134 once the desired relationship therebetween is achieved. The thread lock 140 may be of any suitable type as, for example, an unthreaded plastic insert which creates a slight thread interference.

A master cylinder outer piston 142 slidably received within the master cylinder or bore 144 of the assembly 14 is provided with annular pressure seals 146, 148 and 150 of which seals 146 and 148 are intended to perform a sealing function as between the outer piston 142 and bore 144. A cylindrical inner reaction piston 151 slidably received within a generally concentric bore 152 formed in outer piston 142 is urged axially to the right thereof by a compression spring 154 carried by a retainer 156. A second compression spring 158 contained within bore 144 and seated at one end against a check valve assembly 160 continually urges spring retainer 156 against forward end 162 of outer piston 142. A cup seal 164, disposed between spring 154 and inner reaction piston 151, serves in cooperation with seal 150 to effectively restrict any leakage between inner reaction piston 151 and bore 152.

An abutment member 153, having a generally spherical surface 155 formed thereon abutting against the conical surface 138 of adjusting nut 136, is partly received within one end of, and carried by, the outer piston 142.

A reservoir 166 is provided with a fill port or passage 168 in the bottom wall thereof for filling the cylinder bore 144 when the outer and inner pistons 142 and 151 are in their respective retracted positions as illustrated in FIGURE 1. An additional port 170 is provided in the lower wall of reservoir 166 for communication with the annular chamber 172 between opposite ends of outer piston 142 to prevent cavitation in the cylinder bore 144 during a fast return stroke of the outer piston.

Inner piston 151 is urged into abutting engagement with the forward end of a reaction push rod 174 which is generally loosely received within the inner piston. An annular seal 176, retained within threaded projection 134 by a backing plate 178 and snap ring 180, provides a degree of radial support for the other end of push rod 174 which is contained generally within a recess 182 formed in and extending axially of plunger 44.

Intermediate its ends, push rod 174 is preferably provided with an enlarged pilot diameter 183 which carries an annular reaction spring member 184. In the embodiment shown, spring member 184 is formed of a resilient material and includes a relatively thin centrally apertured disc shaped main body portion 185 and concentric inner and outer annular ridge portions 186 raised from both front and rear faces of the main body portion. Each ridge portion 186 is aligned axially with the ridge portion on the opposite face of the main body portion so that the sets of aligned ridge portions constitute an outer, 187, and inner, 188, spring member connected to each other by a relatively thin bridge portion 190 provided by a central annular section of the main body portion 185. A radiating annular flange 192 secured to or formed integrally with push rod 174 is caused to at times abut against the piston member 120 or against spring 184, as will become evident from the description to follow.

A bellows type seal 193 is secured at one end to extension 132 of piston member 120 as by means of an annular retainer 194 having a bent tab 196 directed radially inwardly through a radial passage 198. A plurality of such tabs and passages 198 may, of course, be provided. The other end of bellows seal 193 is urged radially outwardly by a member 200 against a centrally disposed flange 202 of housing section 18 so as to be axially retained therebetween by radially directed lip portions 204 and 206. A relatively porous gasket 208 retained between housing section 18 and master cylinder assembly 14 enables chamber 210, defined generally by bellows seal 193, to be at substantially ambient atmospheric pressure.

Check valve 160 controls brake fluid flow to and from the outlet passage 212 which in turn is connected by a conduit 214 with the wheel cylinders 216 of brakes 218 of the motor vehicle.

Conduit 220 has one end in communication with a source of vacuum, such as the intake manifold 222 of the vehicle engine 224, and its other end communicating with a chamber 226 of a check valve assembly 228. The check valve assembly may be comprised of a body 230, suitably secured to housing section 18, provided with a conduit portion 232 in open communication with chamber 25. A plurality of passages 234, formed through a wall 236 common to conduit portion 232 and chamber 226, permits the free flow of fluid from chamber 25 to the engine intake manifold but inhibits flow of fluid in the reverse direction. Such directional control of fluid flow is achieved as by means of a relatively flexible valve member 238 contained generally within chamber 226 and mounted on a stem 240 secured within wall 236.

*Operation*

The various elements will assume substantially the positions shown in FIGURE 1 whenever the power brake unit 10 is at rest or inactive. During such periods spring 104 will maintain brake rod 56 and valve plunger 44 to the right limited generally by the abutment of flange 50 against valve body 38. Spring 98 will urge valve portion 72 of poppet valve 68 into sealing engagement with the valve seat surface 88 formed on plunger 44 thereby preventing the flow of ambient air therebetween which is admitted centrally of poppet valve 68 by filter 100.

At this time, with the engine 224 operating at, for example, idle conditions, engine intake manifold vacuum is directed through conduit 220, passages 234, chamber 25, through passage 198 into the space between piston member extension 132 and valve body 38 and into annular recess 110. Manifold vacuum is further transmitted from recess 110 through axially extending passages 112 between poppet valve valving portion 72 and seating surface 90 and into the annulus 114 from where it is directed through radial passage 116 into chamber 27. Because of manifold vacuum being directed to both sides of power piston 118, except for the portion exposed to ambient air pressure in chamber 210 (defined by bellows seal 193), the power piston 118 is maintained in its rearwardmost position as illustrated in FIGURE 1. Spring 158 maintains outer piston 142 and end member 153 in abutting engagement with surface 138 of adjusting nut 136.

When the brake pedal 58 is depressed (pivoted clockwise about pivot 60) brake pedal rod 56 moves valve plunger 44 forwardly to the left thereby allowing spring 98 to move valve portion 72 into sealing engagement with seating surface 90 of valve body 38.

The slightest further movement of brake pedal 58 in the same direction, causes seating surface 88 of plunger 44 to move to the left and away from valving portion 72. Consequently, the further communication of manifold vacuum from passages 112 to annulus 114 is terminated because of the sealing engagement between valving portion 72 and seating surface 90, while communication between annulus 114 and the ambient atmosphere is completed because of the opening created between valving portion 72 and plunger surface 88.

Atmospheric pressure thus admitted to annulus 114 is transmitted through radial passage 116 and into chamber 27 causing an actuating fluid pressure differential to exist across the power piston 118. The brake pedal 58 need not be further depressed since at this stage of operation the power brake unit 10 operates as a full power brake unit. That is, the pressure differential causes power piston 118 to move forwardly to the left carrying with it the adjusting nut 136, end abutment member 153 and outer master cylinder piston 142. The inner reaction piston 151 will not move with piston 142 from the position illustrated in FIGURE 1 and any tendency of inner piston 151 to so move, as may be experienced during movement of outer piston 142, is effectively overcome by the hydraulic pressure developed within cylinder 144.

As outer master cylinder piston 142 moves forwardly to the left, hydraulic brake fluid contained within master cylinder 144 is displaced causing the hydraulically connected wheel brake cylinders 216 to move the vehicle wheel brakes 218 towards vehicle braking position. As outer piston 142 continues its travel to the left, the pressure of the hydraulic brake fluid increases, first to overcome, generally, the force required to move the vehicle brakes against the restraining force of the return springs 242 (initial brake setting force) and thereafter to actually apply the vehicle braking forces.

The increase in hydraulic brake fluid pressure also exhibits itself against cup seal 164 and inner piston 151 as a reaction force which is transmitted to the vehicle operator in the manner to be described.

The initial vehicle brake setting force reacts against inner piston 151, moving it slightly rearwardly, and is transmitted through the reaction push rod 174 into flange 192. As the force increases, flange 192 compresses the outer annular spring 187 against that portion of valve body 38 in juxtaposition therewith. The compression of outer annular spring 187 continues until the total initial vehicle brake setting force is realized, at which time the inner annular spring 188 will be moved axially by flange 192 so that it will be just engaging both the flange 192 and the flange end of valve plunger 44. From the above, it should be apparent that, since the initial vehicle brake setting forces are transmitted into the power brake unit housing by means of valve body 38, the vehicle operator need not physically overcome such forces.

Further movement of the outer piston 142, or any increase in hydraulic brake fluid pressure created thereby causes inner piston 151 to experience an increase in reaction force thereagainst which is also transmitted through reaction push rod 174 and flange 192. As the inner piston experiences such increases in reaction force, the inner annular spring 188 undergoes compression between flange 192 and flange-end of valve plunger 44. During this period, both annular springs 188 and 187 are undergoing compression; however, the force transmitted through outer spring 187 is still being acted against by the power brake unit housing and not the vehicle operator.

Accordingly, it can be seen that during that period of operation wherein both inner and outer annular springs 188 and 187 are being compressed, the vehicle operator senses a reaction force through plunger 44, brake rod 56 and pedal 58 which is related to the actual applied vehicular braking force. However, the reaction force so sensed by the operator during this period is developed by only a portion of the reaction force applied to inner piston 151 since part of that force is still transmitted through the outer annular spring 187 into valve body 38.

As the pressure of the hydraulic brake fluid increases, through the continued action of outer piston 142 and power piston 118, the inner and outer annular springs 188 and 187 are compressed to the degree causing end 244 of push rod 174 to abut against the end of recess 182 and thereby transmit all of such increased reactive forces sensed by inner piston 151 directly into valve plunger 44, brake rod 56 and pedal 58.

All of the above described reaction forces can, of course, be sensed by the vehicle operator without at all moving the pedal 58 any perceptible amount. That is, since the power brake unit 10 does function as a full power brake unit, the amount of movement required by the brake pedal is very slight and need only be that amount sufficient to perform the pneumatic regulation required by seating surfaces 88, 90 and valving portion 72.

In one particularly successful embodiment of the invention, valve plunger 44 had a total movement in the order of 3/64 inch from the at rest condition of the power brake unit to maximum applied braking power while the brake pedal had a total movement in the order of 1/8 inch.

In view of the above, it can be seen that during normal operation the power brake unit 10 functions as a full power brake unit but has the further important advantage of creating a signal, continually indicative of the applied vehicle braking force, which is directed to the vehicle operator through the brake pedal even though the brake pedal experiences a very limited amount of required total travel.

When the brake pedal is released, the spring 104 moves rod 56 and spool 44 to the right, whereby to move valve 68 to the right to re-establish communication between passages 112 and annulus 114 and thereby restore fluid pressure chamber 27 to manifold vacuum pressure. The power piston 118 is returned to its rest position by the atmospheric pressure in bellows chamber 210 acting against the left face of the inner wall of cylindrical extension 132, the right face of which is exposed to manifold vacuum through passages 198. Outer piston 142 and inner piston 151 follow the power piston to the right under the urging of compression spring 158.

Movement of pistons 142 and 151 to the right tends to create a vacuum within the master cylinder 144. The fluid in chamber 172 pressing against seal 146 causes the peripheral edge of that seal to be bent inwardly away from the adjacent cylindrical wall of cylinder 144 to allow fluid from chamber 172 to flow into cylinder 144 as the piston 142 retreats to the right, whereby to maintain cylinder 144 full of fluid. This arrangement enables the brakes to be "pumped" to create a higher brake pedal. During return movement of outer piston 142, spring 154 prevents inner piston 151 from moving to the left into the master cylinder in compensation for the retreating movement of the outer piston 142. It will be understood that if inner piston 151 were allowed to move compensatingly to the left under the urging of the atmospheric pressure in bellows chamber 210, the cylinder 144 would be maintained substantially full of fluid despite the retreating movement of outer piston 142 so that little or no additional fluid would flow into cylinder 144 around seal 146 and the aforesaid "pumping" action would not be available or, if available, would be substantially reduced in effectiveness.

The performance of the various reaction transmitting components of the brake is shown graphically in FIGURE 3 in which brake pedal effort is plotted against hydraulic line pressure. Referring first to the solid line curve of FIGURE 3, which depicts the performance of the brake as described above, it will be seen that the curve includes an initial horizontal portion showing the pedal effort as increasing from zero to 3.5 lbs. while the line pressure holds at its residual value of 10 p.s.i. This curve portion represents the pedal effort required to overcome the resistance of return spring 104 as pedal rod 56 and plunger 44 are moved to the left to initially open valve 68.

The next portion of the solid line curve is vertical and shows the line pressure as increasing from 10 to 70 p.s.i. while the pedal effort holds at 3.5 lbs. This curve portion represents the initial compression of outer annular spring member 187 between flange 192 and valve body 38, allowing the line pressure to build up to the brake setting pressure of 70 p.s.i. without increasing the pedal effort beyond the 3.5 lbs. required to open valve 68.

The next portion of the solid line curve is steeply sloping and linear and shows the line pressure increasing from 70 to 200 lbs. while the pedal effort increases from 3.5 to 8 lbs. This curve portion represents the simultaneous compression of outer annular spring 187 between flange 192 and valve body 38 and of inner annular spring 188 between flange 192 and valve plunger 44; that is, this curve portion depicts that portion of the brake operation in which only a portion of each increase in the reaction force is being transmitted to the brake pedal.

The next portion of the solid line curve slopes somewhat less steeply than the preceding portion and shows the line pressure increasing linearly from 200 p.s.i. as the pedal effort increase from 8 lbs. This curve portion represents the brake behavior following bottoming of end 244 of push rod 174 in recess 182; that is, this curve portion depicts that portion of the brake operation in which all of each increase in the reaction force is transmitted to the brake pedal.

It will be seen from this curve that the present invention provides a three stage transmittal of the reaction force; that is, a first state $S_1$ in which no reaction force is transmitted to the brake pedal, a second stage $S_2$ in which only a portion of each increase in the reaction force is transmitted, and a third stage $S_3$ in which all of each increase in the reaction force is transmitted. This staging of the reaction force enables the line pressure-pedal effort curve as plotted to assume a convex shape.

As previously indicated, in a self-energizing brake, the actual braking force developed is not directly proportional to the line pressure but rather increases by larger and larger increments for each successive increment of increased line pressure. Thus, a plot of deceleration vs. line pressure for a self-energizing brake will produce a concave curve; that is, a curve complementary in shape to the convex solid line curve of FIGURE 3. It will thus be apparent that, by selection of appropriate slopes and limits for the various portions of the solid line curve of FIGURE 3, a power self-energizing brake having a nearly directly proportional relationship between pedal effort and deceleration may be achieved. That is, the non-linearity in the relation of line pressure to pedal effort may be utilized to neutralize the non-linearity in the relation of deceleration to line pressure, whereby to produce a substantially linear relation between pedal effort and deceleration.

It will, of course, be apparent that the three stage feature of the invention has application other than in combination with a self-energizing brake. For example, the three stage feature might be used with a non self-energizing brake to give a low pedal effort to deceleration ratio for relatively light pedal pressures and a higher ratio for relatively heavy pedal pressures.

The three stage reaction feature also facilitates adaption of the brake to vehicles having varying braking requirements. For example, by varying the slope of the curve portion $S_2$ depicting the second stage reaction, the operating characteristics of the brake may be selectively varied.

Thus, for example, if it were desired to employ the basic brake unit described with reference to the solid line curve in a lighter vehicle, the slope of the second stage reaction $S_2$ would be decreased to give a higher pedal effort to line pressure ratio during that stage. Such a reaction characteristic is shown by the second stage portion $S_2$ of the dotted line curve of FIGURE 3. Given the same braking equipment, a lighter vehicle will, of course, require less line pressure to achieve a given rate of deceleration. Thus, by decreasing the slope of the second stage curve portion for a lighter vehicle, the ratio of pedal effort to deceleration during the second stage reaction may be made substantially the same as that for the relatively heavier vehicle depicted by the solid line curve.

Conversely, if it were desired to adapt the basic brake unit to a relatively heavier vehicle, the slope of the second stage reaction could be increased, as shown by the second stage portion $S_2$ of the chain line curve of FIGURE 3, to give a lower pedal effort to line pressure ratio during that stage and thereby a pedal effort to deceleration ratio substantially the same as that for the relatively lighter vehicle depicted by the solid line curve.

The three-stage reaction feature also enables ready adaption of the basic brake unit to vehicles having varying brake setting requirements. Thus, assuming that the brake shoe return springs 242 for the lighter vehicle of the dotted line curve had a lower preload than the return springs 242 of the relatively heavier vehicle of the solid line curve, the vertical extent of the first stage portion $S_1$ of the curve would be lessened to give a lower maximum first stage line pressure corresponding to the lower line pressure required to set the brakes against the lower preload of the return springs. Thus, in FIGURE 3, the height of the first stage reaction portion of the dotted line curve has been lessened to give a maximum first stage line pressure of only 45 lbs. as compared to 70 lbs. for the corresponding portion of the solid line curve.

With regard to the chain line curve, it has been assumed that the return springs 242 in the vehicle represented by that curve have the same preload as those for the solid line vehicle so that the height of the first stage portion $S_1$ of the chain line curve is the same as that for the solid line curve.

The third stage reaction portion $S_3$ of both the dotted and chain line curves, depicting the behavior of the system following bottoming of rod 174 in recess 182, would, of course, have the same slope as the third stage portion of the solid line curve.

In the specific embodiment of the invention disclosed, the slope of the second stage reaction portion and the vertical extent of the first stage portion may be selectively varied simply by selectively varying the cross sectional area of the inner and/or outer annular springs 187 and 188 of the spring member 184.

Thus, for example, the reaction behavior depicted by the chain line curve may be achieved simply by decreasing the cross sectional area of inner spring 188. Decreasing the cross sectional area of spring 188 gives that spring a lower spring rate so that, whereas the first stage reaction will not be effected, a smaller percentage of each increase in the reaction force during the second stage will be transmitted to the brake pedal giving a lower pedal effort to line pressure ratio, as depicted by the steeply sloping second stage portion of the chain line curve.

Similarly, the reaction behavior depicted by the dotted line curve may be achieved simply by increasing the cross sectional area of inner spring 188 and decreasing the cross sectional area of outer spring 187. Decreasing the cross sectional area of outer spring 187 decreases its spring rate so that the line pressure required to compress it to the extent to bring inner spring 188 into contact with valve plunger 44 is correspondingly decreased, as depicted by the lower vertical extent of the first stage portion of the dotted line curve. Increasing the cross sectional area of inner spring 188 gives that spring a higher spring rate so that, once simultaneous compression of both springs has begun, a larger percentage of each instance in the reaction force will be transmitted to the brake pedal giving a higher pedal effort to line presssure ratio, as depicted by the relatively less steeply sloping second stage portion of the dotted line curve.

Other variations in the relative and absolute cross sectional areas of springs 187 and 188, giving other reaction characteristics, will be readily apparent.

It will be seen that the power brake construction of the invention, in addition to enabling the neutralization of the non-linear braking behavior of a self-energizing brake, provides readily variable reaction transmittal characteristics by which the relationship of pedal feel to line pressure may be selectively varied to readily adapt a single basic brake unit to vehicles having widely varying braking requirements.

Although a preferred embodiment of the invention has been illustrated and described in detail, it is to be understood that various changes may be made in the apparatus shown without departing from the scope or spirit of the invention as defined in the appended claims.

I claim:

1. In a hydraulic power brake system including power means operative in response to operator depression of a manual control device to develop hydraulic line pressure and means for applying a force to said control device in a direction to oppose said depression, the improvement wherein said applying means comprises:
   (A) means generating a reaction force which increases with increasing line pressure; and
   (B) means receiving said reaction force and operative
      (1) up to a first predetermined value of the rereaction force, to transmit no reaction force to said control device,
      (2) between said first predetermined value and a second, higher, predetermined value, to transmit to said control device a given finite percentage of each received increase in the reaction force, and
      (3) beyond said predetermined value, to transmit to said control device a higher percentage of each received increase in the reaction force;
   (C) said braking system further including a rigid frame structure mounting said power means for movement relative thereto; and
   (D) said operative means is further operative between said predetermined values to transmit to said frame structure the percentage of each increase in the reaction force not transmitted to said control device.

2. In a hydraulic power brake system including power means operative in response to operator depression of a manual control device to develop hydraulic line pressure and means for applying a force to said control device in a direction to oppose said depression, the improvement wherein said applying means comprises:
   (A) a reaction rod;
   (B) first and second rigid members movable relative to one another in the direction of the axis of said reaction rod;
   (C) means applying a reaction force, proportional to said line pressure, to said reaction rod in a direction to urge it axially toward said first and second members;
   (D) said reaction rod and said first member presenting confronting transverse reaction surfaces spaced axially apart in the absence of a reaction force by a first distance;
   (E) said reaction rod and said second member presenting confronting transverse reaction surfaces spaced axially apart in the absence of a reaction force by a second distance;
   (F) a first spring member disposed between said rod and said first member and having a relaxed length less than said first distance; and
   (G) a second spring member extending between the aforesaid confronting surfaces on said rod and said second member;
   (H) said first rigid member being drivingly connected to said control device so that all of said reaction force up to a predetermined value is absorbed by said second member by compression of said second spring and increases in the reaction force above that value are in part absorbed by said second member by further compression of said second spring and in part transmitted to said control device by compression of said first spring.

3. A hydraulic power brake system according to claim 2 wherein said second rigid member comprises a fixed frame member.

4. In a hydraulic power brake system including power means operative in response to operator depression of a manual control device to develop hydraulic line pressure and means for applying a force to said control device in a direction to oppose said depression, the improvement wherein said applying means comprises:
   (A) a reaction rod;
   (B) first and second rigid members movable relative to one another in the direction of the axis of said reaction rod;
   (C) means applying a reaction force, proportional to said line pressure, to said reaction rod in a direction to urge it axially toward said first and second members;
   (D) said reaction rod and said first member presenting confronting transverse reaction surfaces spaced axially apart in the absence of a reaction force by a first distance;
   (E) said reaction rod and said second member presenting confronting transverse reaction surfaces spaced axially apart in the absence of a reaction force by a second distance;
   (F) a first spring member disposed between said rod and said first member and having a relaxed length less than said first distance; and
   (G) a second spring member extending between the aforesaid confronting surfaces on said rod and said second members;
   (H) said reaction rod including a portion spaced axially from a confronting surface on said first member, in the absence of a reaction force, by a third distance which is greater than the difference between the relaxed length of said first spring and said first distance but less than the lesser of said first and second distances;
   (I) said first rigid member being drivingly connected to said control device so that all of said reaction force up to a first predetermined value is absorbed by said second member by compression of said second spring, increases in the reaction force between said first predetermined value and a second, higher, predetermined value are in part absorbed by said second member by further compression of said second spring and in part transmitted to said control device by compression of said first spring, and increases in the reaction force beyond said second predetermined value are transmitted in whole to said control device by bottoming of said rod portion against the aforesaid confronting surface on said first member.

5. In a hydraulic power brake system including a power piston and valve means operative in response to operator depression of a manual control device to establish a pressure differential across said piston to move the latter to develop hydraulic line pressure, and means for applying a force to said control device in a direction to oppose said depression, the improvement wherein said applying means comprises:
 (A) a reaction rod adapted to receive a reaction force;
 (B) a spring member of resilient material comprising
  (1) a disc-shaped main body portion and
  (2) first and second concentric annular ridge portions raised from one face of said main body portion;
 (C) said spring member being carried by said control rod with said one face normal to the axis of said rod so that said ridge portions project axially from that face; and
 (D) first and second ridge members aligned axially with said rod and movable axially relative to one another and respectively presenting first and second annular reaction surfaces respectively confronting said first and second ridge portions;
 (E) said first ridge member being connected to said control device so that said reaction force is selectively distributed by said spring member between said second member and said control device.

6. In a hydraulic power brake system including a power piston member and valve means operative in response to operator depression of a manual control device to establish a pressure differential across said piston member to move the latter to develop hydraulic line pressure, and means for applying a force to said control device in a direction to oppose said depression; the improvement wherein said applying means comprises:
 (A) a reaction rod adapted to receive a reaction force;
 (B) a spring member of resilient material comprising:
  (1) a relatively thin disc shaped main body portion and
  (2) first and second concentric annular ridge portions raised from each face of said main body portion, each in axial alignment with the corresponding ridge portion on the opposite face;
 (C) said spring member being carried by said reaction rod with said faces normal to the axis of said rod so that said ridge portions project axially away from those faces;
 (D) said reaction rod including a rigid portion presenting a transverse surface confronting and contacting the raised surfaces presented by the ridge portions on one face of said main body portion so as to provide a backing for said spring member; and
 (E) first and second rigid members aligned axially with said rod and movable axially relative to one another and respectively presenting first and second annular reaction surfaces respectively confronting the first and second ridge portions on the opposite face of said main body portion;
 (F) said first rigid member being connected to said control device so that said reaction force is selectively distributed by said spring member between said second member and said control device.

7. In a hydraulic power brake system including a power piston member and valve means operative in response to operator depression of a manual control device to establish a pressure differential across said piston member to move the latter to develop hydraulic line pressure, and means for applying a force to said control device in a direction to oppose said depression; the improvement wherein said applying means comprises:
 (A) a reaction rod adapted to receive a reaction force;
 (B) a spring member of resilient material comprising:
  (1) a relatively thin disc-shaped main body portion and
  (2) inner and outer concentric annular ridge portions raised from the front and rear faces of said main body portion, each in axial alignment with the corresponding ridge portion on the opposite face;
 (C) said main body portion having a central aperture passing said reaction rod to provide a rod portion extending axially beyond the front face of said main body portion;
 (D) said reaction rod including a flange portion disposed behind said main body portion and presenting a transverse surface confronting and contacting the raised surfaces presented by the ridge portions on the rear face of said main body portion to provide a backing for said spring member; and
 (E) concentric inner and outer rigid members aligned axially with said rod and movable axially relative to one another and respectively presenting inner and outer annular reaction surfaces respectively confronting the inner and outer ridge portions on the front face of said main body portion;
 (F) said inner ridge member
  (1) presenting a transverse surface within said inner annular reaction surface and confronting said projecting reaction rod portion, and
  (2) being connected to said control device so that said reaction force is selectively distributed, by said spring member and said projecting reaction rod portion, between said outer member and said control device.

8. In a hydraulic brake system including a master cylinder, a piston member movable in said master cylinder, a power piston drivingly connected to said piston member, valve means operative in response to operator depression of a manual control device to establish a pressure differential across said power piston to move the latter and drive said piston member into said master cylinder to develop hydraulic line pressure, and means for applying a force to said control device in a direction to oppose said depression, the improvement wherein said applying means comprises:
 (A) a reaction rod;
 (B) means applying a force to said reaction rod which is proportional to, but a fraction of, the force applied to said piston member by said power piston;
 (C) first and second rigid members movable axially relative to one another in the direction of the axis of said reaction rod;
 (D) said reaction rod and said first member presenting confronting transverse reaction surfaces spaced axially apart in the absence of a reaction force by a first distance;
 (E) said reaction rod and said second member presenting confronting transverse reaction surfaces spaced axially apart in the absence of a reaction force by a second distance;
 (F) a first spring member disposed between said rod and said first member and having a relaxed length less than said first distance; and
 (G) a second spring member extending between the aforesaid confronting surfaces on said rod and said second members;
 (H) said first rigid member being drivingly connected to said control device so that all of said reaction force up to a predetermined value is absorbed by said second member by compression of said second spring and increases in the reaction force above that value are in part absorbed by said second member by further compression of said second spring and in part transmitted to said control device by compression of said first spring.

9. In a hydraulic power brake system including a master cylinder, a master cylinder piston movable in said master cylinder, a power piston member drivingly connected to said master cylinder piston, valve means operative in response to operator depression of a manual control device to establish a pressure differential across said power piston member to move the latter and drive said master cylinder piston into said master cylinder to develop hydraulic line pressure, and means for applying a force to said control device in a direction to oppose said depression, the improvement wherein said applying means comprises:

(A) a reaction rod;
(B) means applying a force to said reaction rod which is proportional to, but a fraction of, the force applied to said master cylinder piston by said power piston member; and
(C) means receiving said reaction force and operative, over at least a part of the reaction force range below a predetermined value, to transmit to said control device only a given finite percentage of each increase in the reaction force received.

10. In a hydraulic power brake system including a master cylinder, a master cylinder piston movable in said master cylinder, a power piston member drivingly connected to said master cylinder piston, valve means operative in response to operator depression of a manual control device to establish a pressure differential across said power piston member to move the latter and drive said master cylinder piston into said master cylinder to develop hydraulic line pressure, and means for applying a force to said control device in a direction to oppose said depression, the improvement wherein said applying means comprises:

(A) a reaction rod;
(B) means applying a force to said reaction rod which is proportional to, but a fraction of, the force applied to said master cylinder piston by said power piston member; and
(C) means receiving said reaction force and operative
  (1) over at least a part of the reaction force range below a predetermined value, to transmit to said control device only a portion of each increase in the reaction force received, and
  (2) beyond said predetermined value, to transmit to said control device all of the additional reaction force received, whereby, for each brake cycle, the ratio of operator effort to developed line pressure is initially low and subsequently increases.

11. In a hydraulic power brake system including a master cylinder, a master cylinder piston movable in said master cylinder, a power piston member drivingly connected to said master cylinder piston, valve means operative in response to operator depression of a manual control device to establish a pressure differential across said power piston member to move the latter and drive said master cylinder piston into said master cylinder to develop hydraulic line pressure, and means for applying a force to said control device in a direction to oppose said depression, the improvement wherein said applying means comprises:

(A) a reaction rod;
(B) means applying a force to said reaction rod which is proportional to, but a fraction of, the force applied to said master cylinder piston by said power piston member; and
(C) means receiving said reaction force and operative
  (1) up to a first predetermined value of the reaction force, to transmit no reaction force to said control force,
  (2) between said first predetermined value and a second, higher, predetermined value, to transmit to said control device a given finite percentage of each received increase in the reaction force, and
  (3) beyond said predetermined value, to transmit to said control device a higher percentage of each received increase in the reaction force.

References Cited
UNITED STATES PATENTS

| | | | |
|---|---|---|---|
| 2,685,171 | 8/1954 | Price | 60—54.6 |
| 2,690,740 | 10/1954 | Hupp | 60—54.6 X |
| 2,832,316 | 4/1958 | Ingres | 91—369 |
| 2,876,627 | 3/1959 | Ayers | 60—54.6 |
| 2,893,207 | 7/1959 | Hupp | 60—54.6 |
| 2,959,011 | 11/1960 | Randol | 60—54.6 |
| 2,968,926 | 1/1961 | Randol | 60—54.6 |
| 3,009,445 | 11/1961 | Wuellner | 91—369 |
| 3,015,213 | 1/1962 | Augustin | 60—54.6 |
| 3,102,453 | 9/1963 | Brooks et al. | 91—369 |
| 3,109,282 | 11/1963 | Price | 60—10.5 |
| 3,110,031 | 11/1963 | Price | 60—54.5 |
| 3,165,031 | 1/1965 | Rockwell | 91—369 |
| 3,175,235 | 3/1965 | Randol | 91—369 |

MARTIN P. SCHWADRON, *Primary Examiner.*

R. R. BUNEVICH, *Assistant Examiner.*